United States Patent [19]

Takai

[11] Patent Number: 4,874,651
[45] Date of Patent: Oct. 17, 1989

[54] END STRUCTURE FOR SYNTHETIC RESIN MEMBER

[75] Inventor: Ryoji Takai, Yokohama, Japan

[73] Assignee: Nissan Motor Co., Ltd., Yokohama, Japan

[21] Appl. No.: 64,483

[22] Filed: Jun. 22, 1987

[30] Foreign Application Priority Data

Sep. 5, 1986 [JP] Japan .......................... 61-136246[U]

[51] Int. Cl.$^4$ ............................................ B60R 13/04
[52] U.S. Cl. ...................................... 428/81; 428/192
[58] Field of Search .................... 428/192, 31, 83, 81;
52/716, 821, 823, 829, 830

[56] References Cited

U.S. PATENT DOCUMENTS

| 2,000,466 | 5/1935 | Howard | 52/717.1 |
| 2,729,142 | 1/1956 | Beach, Jr. | 52/823 |
| 3,493,257 | 2/1970 | Fitzgerald et al. | 428/31 |
| 4,370,373 | 1/1983 | Janicz | 428/308.4 |
| 4,617,209 | 10/1986 | Ives | 428/31 |

FOREIGN PATENT DOCUMENTS 1950412  1/1971  Fed. Rep. of Germany .

Primary Examiner—Nancy Swisher
Attorney, Agent, or Firm—Foley & Lardner, Schwartz, Jeffery, Schwaab, Mack, Blumenthal & Evans

[57] ABSTRACT

An end structure for a synthetic resin member having a projection formed on the end surface of the synthetic resin member and an end structure portion of synthetic resin injection molded around the projection.

6 Claims, 1 Drawing Sheet

END STRUCTURE FOR SYNTHETIC RESIN MEMBER

BACKGROUND OF THE INVENTION

1. Field of the Invention

The present invention relates to an end structure for a synthetic resin member such as a molding, and in particular to an end structure for a synthetic resin member of a type wherein the end structure is integrally formed by injection on the synthetic resin member.

2. Description of the Related Art

Referring to FIGS. 4 to 10, conventional end structures for synthetic resin member are summarized.

An end structure integrally formed by injection at the end of a synthetic resin member such as a molding, as disclosed in Japanese Utility Model Publication of Unexamined Application No. SHO-55-151857, is commonly known.

In order to make this end structure, an end surface 2 of a molding 1, which is a synthetic resin member is formed in a flat shape perpendicular to the longitudinal direction of the molding 1 as shown in FIG. 4. On the outside of the end surface 2 a terminal or end structure 3 is integrally formed by injection.

In the method of integrally forming the molding end structure 3, the end section of the molding 1 is interposedly supported between a pair of vertical injection molds 5, 7 as in FIG. 5. Molten synthetic resin is pressure injected in the direction of the arrow in FIG. 5 from an injection port 6 in the upper mold 5 into a molding chamber 8 defined by the end surface 2 of the molding 1 and the inner surfaces of the upper mold 5 and the lower mold 7. Accordingly, the end structure 3 is integrally formed in a desired form on the end surface of the molding 1.

In addition, in Japenese Utility Model Publication of Unexamined Application No. SHO-59-35250, an indented portion 13 is formed on a flat end surface 12 of a molding 11 at right angles to the longitudinal direction of the molding 11 as shown in FIG. 7. Then, an end structure 14 is integrally formed on the end portion of the molding 11, by injection into a molding chamber 18 in FIG. 8.

The end structure 14 of the molding 11 is constructed by pressure injection of molten resin, as shown by the arrow in FIG. 8, from an injection port 16 in a top mold 15, into the molding chamber 18 which is defined by the inner surface of an upper die 15 and a lower die 17 and a flat end surface 12 of the molding 11. The molten resin is caused to flow as far as the indented portion 13 so that the end structure 14 is firmly secured to the end portion of the molding 11.

Furthermore, in Japanese Utility Model Publication of Unexamined Application No. SHO-55-91342, an end structure 23 containing an indented portion 24 in the mounting surface side (the top surface in FIG. 9) of a molding 21, which can be for a vehicle body or the like, is integrally formed on a flat end surface 22 of the molding 21 by injection molding as shown in FIG. 10.

The end structure 23 of the molding 21 is interposedly supported by an upper die 25 and a lower die 27. Molten resin is pressure injected, as shown by the arrow in FIG. 10, from an injection port 26 in a top mold 25, into a molding chamber 28 which is defined by the inner surfaces of an upper die 25 and a lower die 27 and a flat end surface 22 of the molding 21. Accordingly, the end structure 23 is integrally formed at the end of the molding 21. In this example, a projecting portion 25A is formed on the inside of the upper die 25 so that the indented portion 24 is formed after molding on the mounting surface side (the upper side in FIG. 9) of the end structure 23.

However, in the conventional structures as shown in FIG. 4 to FIG. 6, the end structure 3 is integrally molded by injection onto the flat end surface 2 of the molding 1 which is a synthetic resin member, so that for the welding area between the flat end surface 2 and the end structure 3 of the molding 1, there is only a narrow area which coincides with the cross sectional area of the molding 1. Adequate strength of weld is therefore not obtained at that welded portion. Accordingly, the end structure 3 will on occasion separate from the end surface 2 after welding. Furthermore, the end structure 3 is solidly formed with a thick body, so a large volume of the molten resin material is required for injection into the molding chamber 18. As a result, after molding, a shrinkage cavity 4 is readily produced in the surface of the end structure 3, so there is the drawback that the outward appearance of the entire body of the molding 1, including the end structure 3, is unsatisfactory.

Also, in the examples of conventional end structures shown in FIG. 7 and FIG. 8, an indented portion 13 is formed in the end surface 12 of the molding 11, so that when the end structure 14 is integrally formed by injection on the end surface of the molding 11 the molten resin from which the end structure 14 is formed flows simultaneously into the indented portion 13 to form an integral body. Accordingly, the welded area between the end surface 12 and the end structure 14 of the molding 11 increases and the welding strength increases. However, because the end structure 14 is solid and thick-bodied and is formed by pressure injection of a large volume of molten resin, a shrinkage cavity is produced on the surface of the end structure 14 after molding as with the conventional example shown in FIG. 4 to FIG. 6, so the drawback occurs that the outward appearance is unsatisfactory.

Furthermore, in the conventional examples shown in FIG. 9 and FIG. 10, the indented portion 24 is formed on the mounting surface side (the top in FIG. 9) on the end structure of the molding 21 for a vehicle or the like, so that the amount of molten resin material required to form the end structure 23 is reduced, and the body thickness of the end structure is also reduced. As a result, the formation of the shrinkage cavity in the surface is prevented. However, after the end structure 23 is molded, a tip portion 23A is inclined to be distorted from the regular shape shown by the solid line 23A to the shape indicated by the dotted line 23AA in FIG. 9. The drawback occurs that the molding, especially in the status of the mounted end structure 23 and its outward appearance, is unsatisfactory.

SUMMARY OF THE INVENTION

An object of the present invention is to provide an end structure for a synthetic resin member wherein the abovementioned problems areas are not present, and wherein a projection is formed on the end surface of the body of the synthetic resin member and an end structure portion of synthetic resin is integrally pressure molded around the projection by injection to form the end structure.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
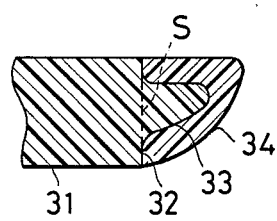
FIG. 1 is a cross sectional view showing a first embodiment of the end structure of the present invention provided on a molding which is a synthetic resin member.
Figure 2:
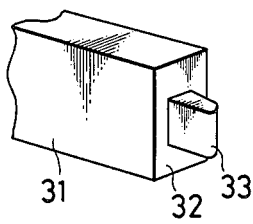
FIG. 2 is a perspective view of the molding with a projection for the end structure of FIG. 1.
Figure 3:
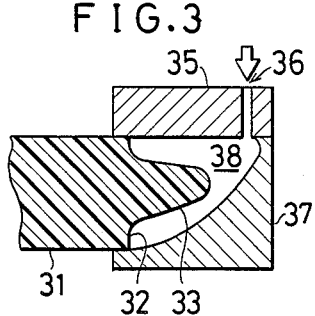
FIG. 3 is a cross sectional view which explains the molding process for the end structure of FIG. 1.
Figure 4:
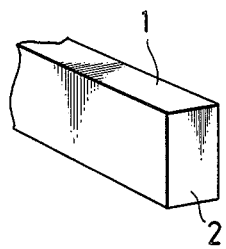
FIG. 4 is a perspective view showing a conventional example corresponding to FIG. 2.
Figure 5:
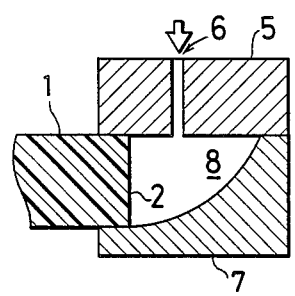
FIG. 5 is a cross sectional view showing a conventional example corresponding to FIG. 3.
Figure 6:
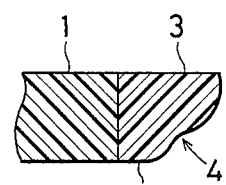
FIG. 6 is a perspective view showing a conventional example corresponding to FIG. 1.
Figure 7:
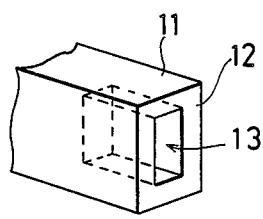
FIG. 7 is a perspective view showing another conventional embodiment of the molding end structure.
Figure 8:
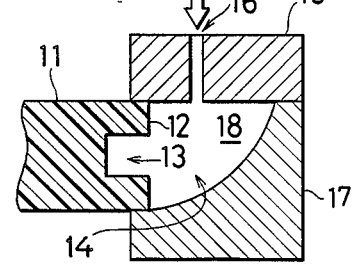
FIG. 8 is a cross sectional view which explains the molding process for the end structure of FIG. 7.
Figure 10:
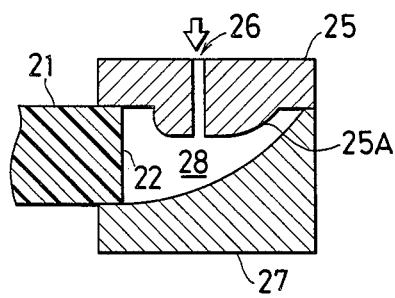
FIG. 10 is a cross sectional view which explains the molding process for the end structure of FIG. 9.
Figure 9:
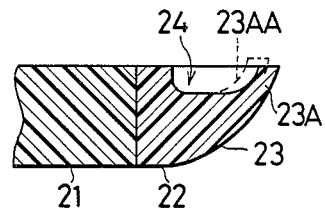
FIG. 9 is a cross sectional view showing another conventional embodiment of the molding end structure.

Now referring to FIG. 1 to 3, a projection 33 projects from a flat end surface 32 of a molding 31 which is a synthetic resin member, and an end structure portion 34 of synthetic resin is integrally formed by injection molding around the projection 33. It will be noted that the end structure portion 34 and the projection cooperate to form an end structure. The projection may be formed in a separate body and then welded or otherwise attached to the molding 31 as shown by the dotted line S in FIG. 1. However, in this desirable embodiment of the present invention, the projection 33 is formed as an integral member of the molding 31 projecting from the center section of the end surface to the outside. Further, the projection 33 is formed with a smaller volume than the end structure portion 34 formed on the molding 31. In addition, the profile of the projection 33 is smoothly formed so that it does not hinder the flow of the molten synthetic resin. As shown in FIG. 3, a molding chamber is defined by a lower die 37 and an upper die 35 which is provided with an injection port 36 for the molten synthetic resin.

In FIG. 3, the end structure of a molding which is a synthetic resin member is formed in the following manner.

Specifically, the projection 33 which is integrally formed at the end of the molding 31 and projects in the outward direction from the flat and surface 32, is positioned in advance at almost dead center of the molding chamber 38 defined by the inner surfaces of an upper die 35 and a lower die 37. Next, molten synthetic resin is injected from the injection port 36 in the upper die 35 into the molding chamber 38, defined by the circumferential surface of the projection 33 and the end surface 32 of the body of the molding 31 and the inner surfaces of the upper and lower dies 35 and 37. Accordingly, the end structure portion 34 is integrally formed on the end surface 32 of the molding 31 and around the projection 33 as shown in FIG. 1.

Then, the molding provided with the end structure of the present invention can be mounted by a suitable means and used in a designated position on a vehicle body or the conventional moldings.

In addition to the same effects obtained as in a conventional molding, the following effects are obtained in the present invention.

(1) The end structure portion of synthetic resin is integrally molded by injection molding around a projection which is formed so that it projects from the end surface of a synthetic resin member, so that a reduction is obtained in the volume of molten synthetic resin pressure injected by the volume of the projection, and the thickness of the end structure portion formed around the projection is reduced. Accordingly, after the end structure portion is molded, no shrinkage cavity occurs in its surface, and therefore the problem does not arise that an unsatisfactory outward appearance is produced in the end structure.

(2) The solid projection integral with the synthetic resin member is positioned within the end structure portion, so that, although the end structure portion is constructed thin, the end structure portion does not become distorted after molding. Accordingly, the synthetic resin member with the end structure of the present invention, can be satisfactorily mounted and maintained on its objective.

(3) The entire circumferential surface of a projection formed on the flat end surface of the synthetic resin member mates with the entire inner circumferential surface of the end structure portion, which is molded around the projection. Therefore, the common welded area between the synthetic resin member and its end structure is remarkably increased in comparison with conventional examples, and both are firmly welded together to form an excellent end structure.

What is claimed is:

1. An end structure for a synthetic resin member, comprising:
    an end surface of said member, said end surface including a first generally central region and a second region radially surrounding said first region;
    a projection provided to protrude from the first region so as to expose an entire outer peripheral surface of said projection and said second region; and
    a portion of synthetic resin injection molded onto said member so as to completely cover said outer peripheral surface of said projection and said second region.

2. The end structure of claim 1, wherein said portion covering said projection and said second region is molded relatively thin to prevent a shrinkage cavity.

3. The end structure of claim 1, wherein the member and the portion of synthetic resin have respective peripheral surfaces aligned at said end surface.

4. The end structure of claim 1, wherein said second region is flat.

5. The end structure of claim 1, wherein said projection is integrally molded with said end surface.

6. The end structure of claim 1, wherein said projection is formed of synthetic resin.

* * * * *